United States Patent
Mizuno et al.

(10) Patent No.: US 7,007,513 B2
(45) Date of Patent: Mar. 7, 2006

(54) METHOD OF MANUFACTURING GLASS PARTS FOR CONNECTION OF OPTICAL FIBERS, METHOD OF MANUFACTURING MOTHER GLASS TO PRODUCE GLASS PARTS, AND GLASS PARTS FOR CONNECTION OF OPTICAL FIBERS

(75) Inventors: Toshiaki Mizuno, Osaka (JP); Katsuya Kamisaku, Osaka (JP); Masahiro Morishita, Osaka (JP)

(73) Assignee: Nippon Sheet Glass Co., Ltd., (JP)

( * ) Notice: Subject to any disclaimer, the term of this patent is extended or adjusted under 35 U.S.C. 154(b) by 238 days.

(21) Appl. No.: 10/287,373

(22) Filed: Nov. 4, 2002

(65) Prior Publication Data

US 2003/0143349 A1 Jul. 31, 2003

Related U.S. Application Data

(62) Division of application No. 09/527,646, filed on Mar. 17, 2000, now Pat. No. 6,499,886.

(30) Foreign Application Priority Data

| Mar. 17, 1999 | (JP) | ................................ 11-72339 |
| Oct. 28, 1999 | (JP) | ............................... 11-307099 |

(51) Int. Cl.
 *C03B 23/047* (2006.01)
(52) U.S. Cl. ........................................ 65/102; 65/64
(58) Field of Classification Search ................ 65/406, 65/407, 64, 102, 271, 275; 385/82, 50, 55, 385/70, 72, 79, 81, 83, 78
See application file for complete search history.

(56) References Cited

U.S. PATENT DOCUMENTS

| 4,179,186 | A |   | 12/1979 | Tynes .......................... 350/96.21 |
| 4,201,443 | A | * | 5/1980 | Hodge .............................. 385/88 |
| 4,353,620 | A | * | 10/1982 | Schultz ............................ 385/70 |
| 4,391,487 | A | * | 7/1983 | Melman et al. ................ 385/82 |
| 4,697,872 | A | * | 10/1987 | Serrander ....................... 385/55 |
| 4,725,118 | A | * | 2/1988 | Serrander ....................... 385/82 |
| 4,848,870 | A | * | 7/1989 | Wisecarver et al. ............ 385/55 |
| 4,960,316 | A | * | 10/1990 | Berkey ........................... 385/95 |
| 4,978,377 | A |   | 12/1990 | Brehm et al. ................. 65/3.11 |
| 5,745,626 | A |   | 4/1998 | Duck et al. ..................... 385/96 |
| 5,891,210 | A |   | 4/1999 | Watanabe et al. ............. 65/406 |
| 6,103,344 | A | * | 8/2000 | Ota et al. ..................... 428/172 |

FOREIGN PATENT DOCUMENTS

| JP | 2788800 | 6/1998 |

OTHER PUBLICATIONS

Definition of Spherical Polygon and Triangle, http://mathworld.wolfram.com, printed Apr. 19, 2005, 2 pages.*

* cited by examiner

*Primary Examiner*—Steven P. Griffin
*Assistant Examiner*—Lisa L. Herring
(74) *Attorney, Agent, or Firm*—Rossi, Kimms & McDowell, LLP

(57) ABSTRACT

A method of manufacturing glass parts for connection of glass fibers is provided, which can improve the accuracy of the cross-sectional size of a through hole in the glass part. A mother glass having a similar cross section to a desired cross section of a glass part having a through hole is prepared, and the prepared mother glass is drawn while it is heated. The mother glass is made of a glass having a maximum devitrification speed of 100 μm or less per minute.

6 Claims, 9 Drawing Sheets

FIG.2
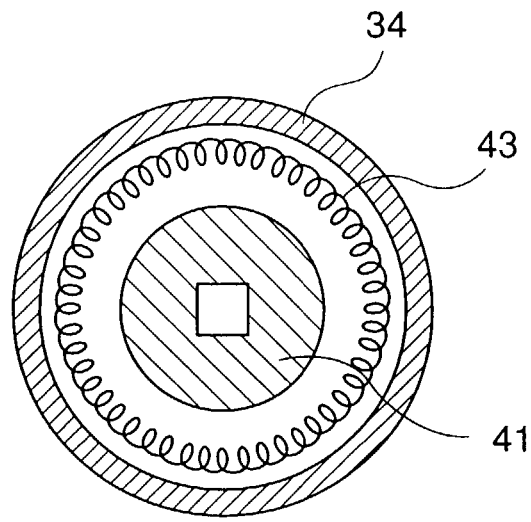
FIG.3A  FIG.3B  FIG.3C
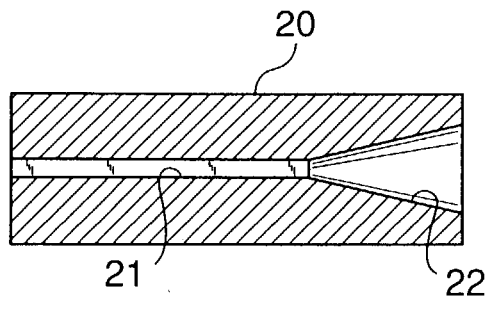 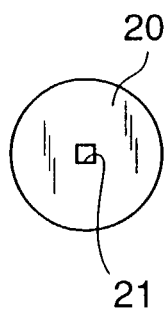 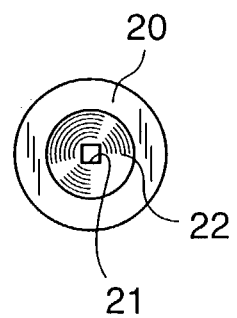
FIG.4A  FIG.4B  FIG.4C
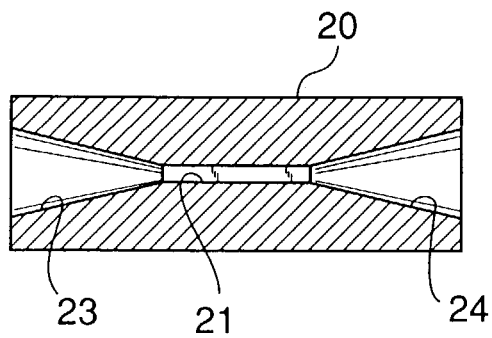 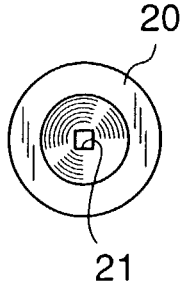 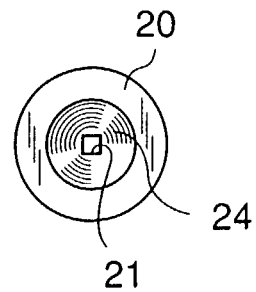

FIG.11A
BEFORE JOINING
FIG.11B
AFTER JOINING
FIG.11C
AFTER PROCESSING
HEAT FUSION  →  MACHINING  →
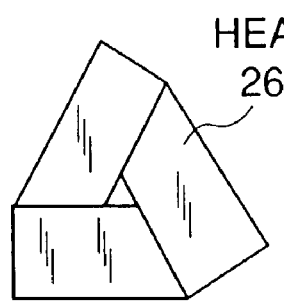
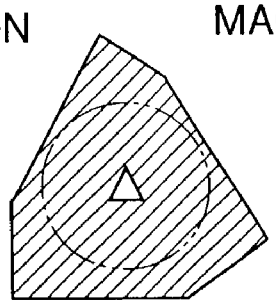
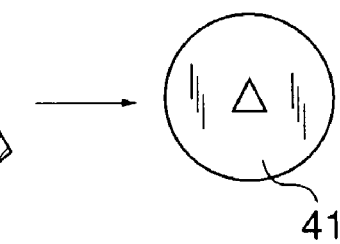
FIG.12A
BEFORE JOINING
FIG.12B
AFTER JOINING
FIG.12C
AFTER PROCESSING
HEAT FUSION  →  MACHINING  →
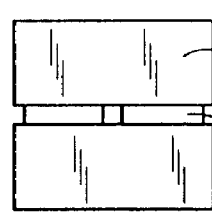
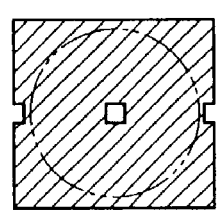
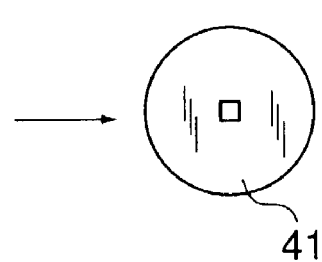

FIG.13A
BEFORE JOINING
FIG.13B
AFTER JOINING
FIG.13C
AFTER PROCESSING
HEAT FUSION → MACHINING →
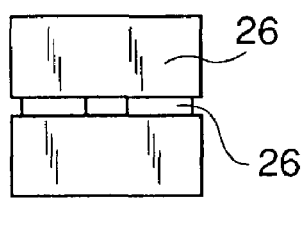
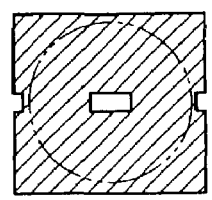
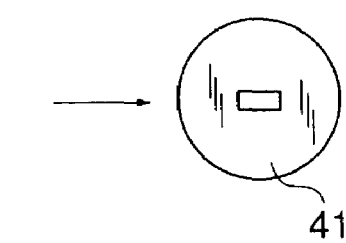
FIG.14A
BEFORE JOINING
FIG.14B
AFTER JOINING
FIG.14C
AFTER PROCESSING
HEAT FUSION → MACHINING →
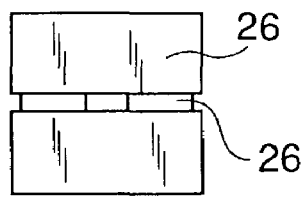
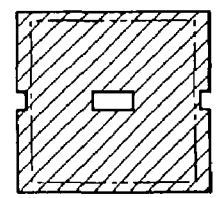
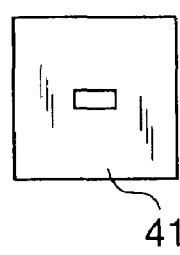

METHOD OF MANUFACTURING GLASS PARTS FOR CONNECTION OF OPTICAL FIBERS, METHOD OF MANUFACTURING MOTHER GLASS TO PRODUCE GLASS PARTS, AND GLASS PARTS FOR CONNECTION OF OPTICAL FIBERS

The present Application is a Divisional Application of U.S. patent application Ser. No. 09/527,646 filed on Mar. 17, 2000 now U.S. Pat. No. 6,499,886.

BACKGROUND OF THE INVENTION

1. Field of the Invention

The present invention relates to a method of manufacturing glass parts for connection of optical fibers, method of manufacturing mother glass to produce glass parts, and glass parts for connection of optical fibers.

2. Prior Art

Generally, in optical communication systems and optical applied equipment, optical connectors are used to connect optical fibers or connect an optical fiber and a light emitting/receiving device or the like.

Conventionally, optical connectors of this kind are divided into a split type as disclosed in Japanese Patent (KOUHOU) No. 2788800 and an integral type as shown in cross section in FIG. 17.

The integral type optical connector shown in FIG. 17 is comprised of a cylindrical glass ferrule 10 having a through hole 11 with a small diameter formed therein along a longitudinal central axis thereof. Optical fibers 12 and 13 are held in the through hole 11 with end faces 14 thereof abutting against each other. A matching agent (epoxy adhesive agent or ultraviolet hardening resin) is filled between the end faces 14. The matching agent acts to match the refractive index between the optical fibers 12 and 13, as well as bond the optical fibers together. The through hole 11 is tapered at its opposite open ends 15 and 16, so as to facilitate insertion of the optical fibers 12 and 13 into the through hole 11. The matching agent or an adhesive agent is filled in the open ends 15 and 16, and in gaps between the wall of the through hole 11 and the optical fibers 11 and 12 in order to fix the optical fibers 12 and 13 inside the through hole 11.

The ferrule 10 constructed as above is manufactured by forming a mother glass having a similar cross section to that of the ferrule, forming a through hole in the mother glass by machining, then drawing the mother glass with a through hole thus formed while heating the same to obtain a drawn glass, and then cutting the drawn glass into a suitable length. In manufacturing the ferrule 10, the formation of the mother glass and the through hole may be performed by press molding.

The ferrule 10 which is manufactured in the above described manner requires to have dimensional tolerances of ±3"5 µm of the cross-sectional size of the through hole 11, so as to locate the optical fibers with an accuracy of the order of light wavelength.

According to the conventional manufacturing method described above, sufficient dimensional accuracy of the cross-sectional size of the through hole 11 cannot be achieved because the ferrule 10 is formed by hot drawing a prepared mother glass. As a result, the optical fibers 12 and 13 cannot be smoothly inserted into the ferrule 10, nor held in place with accuracy.

Further, the process of forming a through hole in the mother glass to manufacture the ferrule 10 by machining or by press molding takes much time and labor to perform.

In addition, the conventional ferrule 10 is solely designed to make a connection between single optical fibers and cannot make a connection between groups of plural optical fibers

SUMMARY OF THE INVENTION

It is a first object of the present invention to provide a method of manufacturing glass parts for connection of optical fibers, which can improve the accuracy of the cross-sectional size of a through hole in the glass part.

It is a second object of the present invention to provide a method of manufacturing mother glass to produce glass parts for connection of optical fibers, which can easily form a through hole in the mother glass.

It is a third object of the present invention to provide glass parts for connection of optical fibers, which are suitable for making a connection between groups of plural optical fibers.

To attain the first object, the present invention provides a method of manufacturing a glass part for connection of optical fibers, the glass part having at least one through hole formed therein to hold optical fibers, comprising the steps of:

preparing a mother glass having a similar cross section to a desired cross section of the glass part; and drawing the prepared mother glass while heating the same;

wherein the mother glass is made of a glass having a maximum devitrification speed of 100 µm or less per minute.

Preferably, the mother glass is made of a glass having a maximum devitrification speed of 10 µm or less per minute.

More preferably, the mother glass is made of a glass selected from the group consisting of soda lime silicate glass, low alkali silicate glass, and germanate glass.

To attain the second object, the present invention provides a method of manufacturing mother glass to produce glass parts for connection of optical fibers, comprising the steps of:

is putting together a plurality of glass elements having a polygonal cross section so as to form a through hole having a polygonal cross section; and bonding together the glass elements put together by heat fusion.

Preferably, the glass elements comprises a number of glass elements equal to a number of sides of said polygonal cross section.

To attain the third object, the present invention provides a glass part for connection of optical fibers having at least one through hole formed therein to hold optical fibers, wherein the through hole has a cross section of a shape selected from the group consisting of polygon, oblong, ellipse, connected circles, and connected squares.

In a preferred embodiment, the through hole has a cross section of a shape selected from the group consisting of hexagon, octagon, and connected squares.

In another preferred embodiment, the through hole has a cross section of a shape selected from the group consisting of oblong, connected circles, and ellipse.

Preferably, the glass part is made of a glass having a maximum devitrification speed of 100 µm or less per minute.

More preferably, the glass part is made of a glass having a maximum devitrification speed of 10 µm or less per minute.

Further preferably, the glass part is made of a glass having approximately the same coefficient of linear expansion as that of optical fibers to be connected.

In another preferred embodiment, the glass part for connection of optical fibers has a through hole formed therein to hold optical fibers, wherein the through hole comprises a plurality of through holes.

The term "cross section" used throughout the present specification refers to a sectional form perpendicular to the direction in which the mother glass is drawn.

The above and other objects, features and advantages of the invention will become more apparent from the following detailed description taken in conjunction with the accompanying drawings.

BRIEF DESCRIPTION OF THE DRAWINGS

FIG. 2 is a cross-sectional view taken along line II—II of FIG. 1.

FIGS. 3A to 3C are views of a ferrule manufactured by the manufacturing method according to the present invention, which has a through hole formed therein with a tapered open end, in which:

FIG. 3A is a longitudinal sectional view of the ferrule;
FIG. 3B is an end view showing an end face thereof; and
FIG. 3C is an end view showing the other end face;

FIGS. 4A to 4C are views of a ferrule, manufactured by the manufacturing method according to the present invention, which has a through hole formed therein with opposite tapered open ends, in which:

FIG. 4A is a longitudinal sectional view of the ferrule;
is FIG. 4B is an end view showing an end face thereof; and
FIG. 4C is an end view showing the other end face;

FIGS. 5A to 5C are views useful in explaining a cross section of a through hole 21 formed in a ferrule 20, where the ferrule 20 has a circular cross section and the through hole 21 has a square cross section, in which:

FIG. 5A is a longitudinal sectional view of the ferrule;
FIG. 5B is an end view showing an end face thereof; and
FIG. 5C is an end view showing the other end face;

FIGS. 6A to 6C are views useful in explaining a cross section of a through hole 21 formed in a ferrule 20, where the ferrule 20 has a circular cross section and the through hole 21 has a cross section of equilateral triangle, in which:

FIG. 6A is a longitudinal sectional view of the ferrule;
FIG. 6B is an end view showing an end face thereof; and
FIG. 6C is an end view showing the other end face;

FIGS. 7A to 7C are views useful in explaining a cross section of a through hole 21 formed in a ferrule 20, where the ferrule 20 has a circular cross section and the through hole 21 has a rectangular cross section, in which:

FIG. 7A is a longitudinal sectional view of the ferrule;
FIG. 7B is an end view showing an end face thereof; and
FIG. 7C is an end view showing the other end face;

FIGS. 8A to 8C are views useful in explaining a cross section of a through hole 21 formed in a ferrule 20, where the ferrule 20 has a square cross section and the through hole 21 has a rectangular cross section, in which:

FIG. 8A is a longitudinal sectional view of the ferrule;
FIG. 8B is an end view showing an end face thereof; and
FIG. 8C is an end view showing the other end face;

FIGS. 9A to 9C are transverse sectional views of the ferrules 20 of FIGS. 5A to 7C when a plurality of optical fibers are inserted in the respective through holes 21, in which:

FIG. 9A shows a state where two optical fibers are held within the through hole with a square cross section;
FIG. 9B shows a state where three optical fibers are held within the through hole with an equilateral triangular cross section; and
FIG. 9C shows a state where two optical fibers are held within the through hole with a rectangular cross section;

FIGS. 10A to 10K are transverse sectional views showing variations of the ferrule 20 with various cross sections of through hole 21, in which:

FIG. 10A shows a state where two optical fibers are held within a through hole 21 with a hexagonal cross section;
FIG. 10B shows a state where three optical fibers are held in a line within a through hole 21 with an octagonal cross section;
FIG. 10C shows a state where two optical fibers are held within a through hole 21 with an oblong cross section;
FIG. 10D shows a state where three optical fibers are held in a line within a through hole 21 with an oblong cross section;
FIG. 10E shows a state where two optical fibers are held within a through hole 21 with a cross section of connected circles;
FIG. 10F shows a state where three optical fibers are held in a line within a through hole 21 with a cross section of connected circles;
FIG. 10G shows a state where five optical fibers are held in a line within a through hole 21 with a cross section of connected circles;
FIG. 10H shows a state where a bundle of four optical fibers are held within a through hole 21 with a cross section of connected circles;
FIG. 10I shows a state in which two optical fibers are held within a through hole 21 with a cross section of ellipse;
FIG. 10J shows a state where two optical fibers are held within a through hole 21 with a cross section of connected squares; and
FIG. 10K shows a state where three optical fibers are held in a line within a through hole 21 with a cross section of connected squares;

FIGS. 11A to 11C are views showing a method of manufacturing mother glass to produce glass parts according to an embodiment of the present invention, where the mother glass 41 has a circular cross section and the through hole in the mother glass 41 has a cross section of equilateral triangle, in which:

FIG. 11A shows a state before joining;
FIG. 11B shows a state after joining; and
FIG. 11C shows a state after processing;

FIGS. 12A to 12C are views showing a method of manufacturing mother glass to produce glass parts according to another embodiment of the present invention, where the mother glass 41 has a circular cross section and the through hole in the mother glass 41 has a square cross section, in which:

FIG. 12A shows a state before joining;
FIG. 12B shows a state after joining; and
FIG. 12C shows a state after processing;

FIGS. 13A to 13C are views showing a method of manufacturing mother glass to produce glass parts according to still another embodiment of the present invention, where the mother glass 41 has a circular cross section and the through hole in the mother glass 41 has a rectangular cross section, in which:

FIG. 13A shows a state before joining;
FIG. 13B shows a state after joining; and
FIG. 13C shows a state after processing;

FIGS. 14A to 14C are views showing a method of manufacturing mother glass to produce glass parts according to a further embodiment of the present invention, where the mother glass 41 has a square cross section and the through hole in the mother glass 41 has a rectangular cross section, in which:

FIG. 14A shows a state before joining;

FIG. 14B shows a state after joining; and

FIG. 14C shows a state after processing;

FIGS. 15A to 15C are views showing a ferrule 50 as a glass part for connection of optical fibers according to an embodiment of the present invention, in which:

FIG. 15A is a longitudinal cross-sectional view of the ferrule;

FIG. 15B is an end view of an end face thereof; and

FIG. 15C is an end view of the other end face;

DETAILED DESCRIPTION

The present invention will now be described in detail with reference to the drawings showing embodiments thereof.

The present inventors have made studies to reach the following finding: Using a mother glass made of a glass having a maximum devitrification speed of 100 $\mu$m or less per minute, preferably 10 $\mu$m or less per minute to manufacture a ferrule as a glass part for connection of optical fibers makes it possible to substantially prevent the occurrence of devitrification, i.e. formation of microscopic crystals in the surface of the glass during the hot drawing process of the mother glass, which in turn prevents the occurrence of micro irregularities on the inner surface of the through hole. This facilitates the insertion of optical fibers into the through hole of the ferrule, and further prevents disalignment of the central axes of the optical fibers held within the through hole. If a mother glass made of a glass having a maximum devitrification speed exceeding 100 $\mu$m per minute is used, the accuracy of the cross-sectional size of the through hole of the ferrule falls outside the tolerances.

Devitrification of a glass refers to a phenomenon that a portion of the glass composition precipitates in the form of crystals when the glass is maintained at a temperature above the transition point of the glass and below the melting point of the glass such that the mechanical properties and dimensional accuracy of the glass tend to be degraded.

The devitrification speed of a glass refers to a rate at which the devitrification proceeds. A glass having a lower devitrification speed has fewer microscopic crystal precipitates within the glass and has fewer surface irregularities. Further, the devitrification speed becomes higher as the temperature at which the glass is maintained becomes higher than the transition point of the glass, and becomes lower as the temperature is further raised toward the melting point of the glass. That is, the devitrification speed reaches its maximum value at a point intermediate between the transition point and the melting point. This maximum value will be referred to as the maximum devitrification speed.

The method of manufacturing glass parts for connection of optical fibers according to an embodiment of the present invention will now be described in detail with reference to the drawings.

Figure 1:
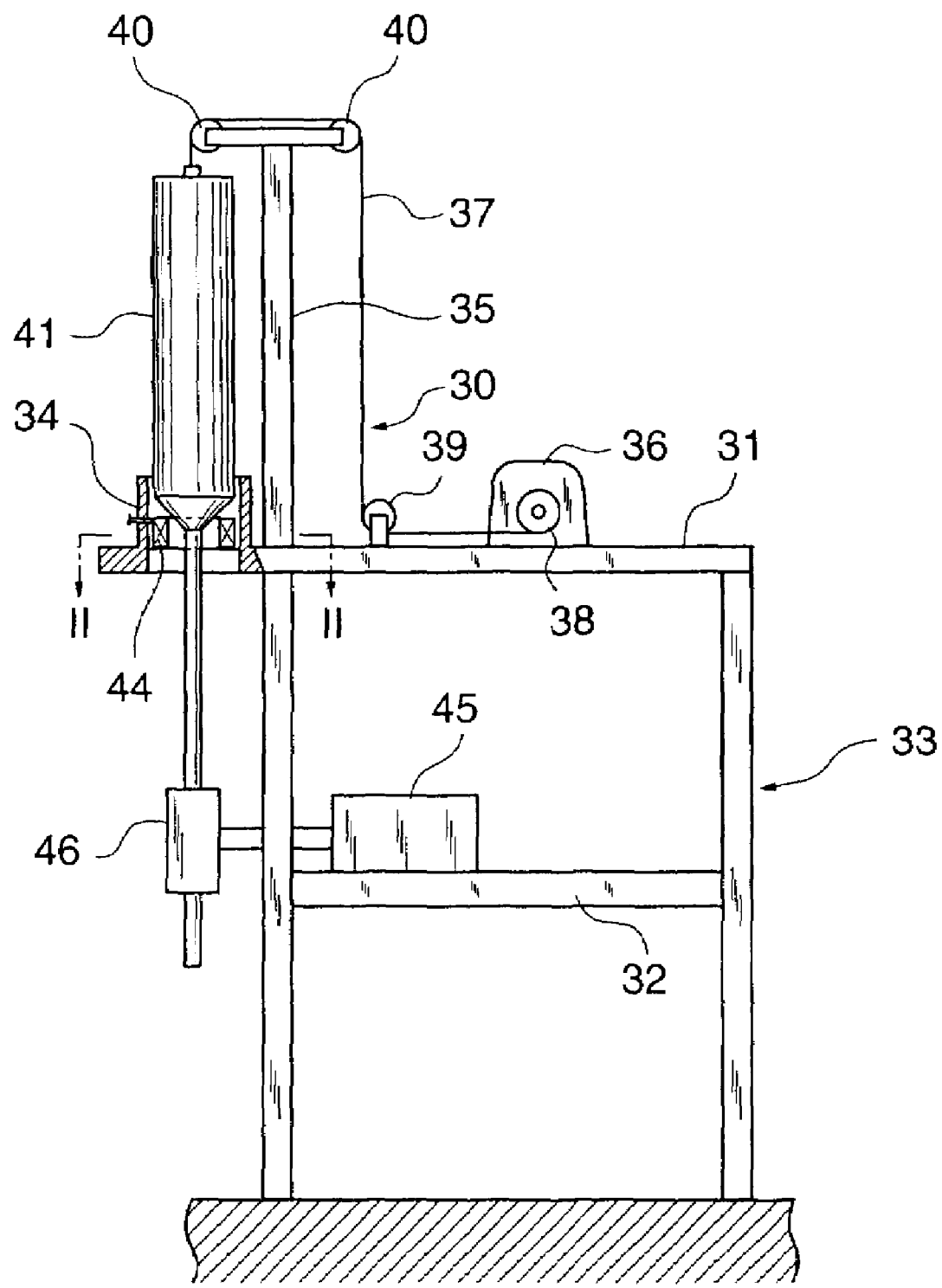
FIG. 1 is a schematic view showing the construction of a manufacturing apparatus which implements the method of manufacturing glass parts for connection of optical fibers according to the present invention.

FIG. 1 is a schematic view showing the construction of a manufacturing apparatus which implements the manufacturing method according to the present invention.

In FIG. 1, reference numeral 30 denotes an apparatus for manufacturing a cylindrical ferrule as a glass part for connection of optical fibers. The manufacturing apparatus 30 includes a table 33 which is comprised of an upper stage 31, and a middle stage 32. The upper stage 31 has an extension at one side thereof, on which is mounted a tubular heating furnace 34, which will be described later.

A T-shaped support 35 is erected on the upper stage 31 in opposed relation to the heating furnace 34, and a motor 36 is placed adjacent to the support 35. A wire 37 is wound around a pulley 38 mounted on a driving shaft of the motor 36, a pulley 39 placed on the upper stage 31, and a pair of pulleys 40, 40 mounted on an upper end of the support 35, with one end of the wire 37 secured to an upper end of a cylindrical mother glass 41. A lower end of the mother glass 41 is introduced into the heating furnace 34. The mother glass 41 has a through hole with a square cross-section formed therein along a longitudinal central axis thereof. The rotational speed of the driving shaft of the motor 36 is controlled by a control unit, not shown, to thereby control the speed at which the mother glass 41 is fed into the heating furnace 34.

As shown in FIG. 2, which is a cross-sectional view taken along line II—II of FIG. 1, an electric heater 43 is provided in the tubular heating furnace 34 to heat the lower end of the mother glass 41. The electric heater 43 is connected to the above-mentioned control unit to be controlled thereby.

Further, a motor 45 is mounted on the middle stage 32 of the table 33. Coupled to a driving shaft of the motor 45 are a pair of draw rollers 46, which tightly grip therebetween and draw the glass downward from the mother glass 41. The rotational speed of the driving shaft of the motor 45 is also controlled by the control unit, and thus the rotational speed of the draw rollers 46 is controlled, to thereby control the drawing speed of the mother glass 41.

With the above described arrangement, the mother glass 41 is fed into the heating furnace 34 at a predetermined feed speed, and at the same time the mother glass 41 is drawn at a predetermined drawing speed. The drawn glass thus obtained is cut into a suitable length, to obtain cylindrical ferrules.

Now, description will be given of the method of manufacturing ferrules as glass parts for connection of optical fibers according to the present invention using the manufacturing apparatus 30.

1st Step

First, the mother glass 41 is prepared from a glass material by subjecting the glass material to usual machining such as chopping, cutting and grinding, or to hot pressing or the like, or to a glass bonding method, described later. The prepared mother glass 41 has a similar cross section to that of a ferrule having a through hole for holding optical fibers, formed along a longitudinal central axis thereof. The mother glass 41 has a cross-sectional area 100 to 5000 times as large as that of the ferrule to be obtained. The length of the mother glass 41 is determined by dimensional constraints and others of the manufacturing apparatus 30, but should preferably be as large as possible from a standpoint of storage space saving.

2nd Step

The mother glass 41 prepared by the first step is mounted onto the manufacturing apparatus 30 by suspending it from one end of the wire 37. Then, the motor 36 is rotated to introduce the lower end of the mother glass 41 into the heating furnace 34. Then, the electric heater 43 is energized so that the heating furnace 34 heats the lower end of the mother glass 41. Glass that is drawn downward from the mother glass 41 by this heating is passed through the draw rollers 46 and pulled downward by the draw rollers 46 which are rotated by the motor 45.

Thereafter, the motors 36 and 45 are controlled to introduce the mother glass 41 into the heating furnace 34 at a predetermined feed speed, described later, and simultaneously pull the mother glass 41 downward at a predetermined drawing speed, also described later. During the feeding and drawing, the electric heater 43 is controlled to maintain the heating temperature of the mother glass 41 within a predetermined range. More specifically, the mother glass 41 is heated to such a temperature within a predetermined temperature range that its viscosity becomes $10^5$ to $10^9$ poise, and more preferably, to such a temperature within a predetermined temperature range (below the softening temperature) that its viscosity becomes $10^{7.8}$ to $10^9$ poise. For example, if the material of the mother glass 41 is a favorable glass material as described later, the predetermined temperature range is 600 to 930° C., and more preferably be 730 to 930° C. The drawn glass that was hot drawn within this predetermined temperature range maintains a similarity in cross section to that of the mother glass 41.

The ratio of the drawing speed to the feed speed of the mother glass 41 is preferably 20 to 4000. If the ratio is below 20, the mother glass 41 is drawn at too low a drawing rate, leading to degraded productivity, whereas, if the ratio exceeds 4000, the drawing rate becomes too large, leading to an unstable cross section perpendicular to the drawing direction of the drawn glass. Preferably, the ratio is in a range of 100 to 1000.

3rd Step

Next, the drawn glass is cut into a desired length to obtain ferrules as glass parts for connection of optical fibers. The cutting is performed by means of a diamond saw, glass cutter, water jet, or the like.

The above three steps describe the method of manufacturing ferrules from the mother glass 41 such that the ferrules have a desired cross section similar to that of the mother glass 41. The dimensions of the ferrules depend on the application of the optical fibers to be connected, etc. For example, the outside diameter is 0.2 to 2.5 mm, typically 1.2 to 2.0 mm, and the diameter of the through hole or the size of one side thereof if the through hole has a polygonal cross section is 0.1 to 0.3 mm, and the length of the through hole is 50 mm or less, typically 10 to 15 mm.

It is preferable that the open ends of the through hole of the optical part or ferrule should be tapered so as to facilitate insertion of the optical fibers into the through hole.

Now, examples of the method of the present invention and the comparative examples will be described.

First, as the mother glass 41, mother glasses formed, respectively, of soda lime silicate glass, low alkali silicate glass, germanate glass, silicate glass-1, and silicate glass-2 having compositions and maximum devitrification speed shown in Table 1 were prepared as samples. The values of maximum devitrification speed of the samples are shown in Table 1. As shown in Table 1, the samples of soda lime silicate glass and low alkali silicate glass have a maximum devitrification speed below 10 μm per minute (soda lime silicate glass: 5 μm per minute, and low alkali silicate glass: 0.1 μm per minute), and the sample of germanate glass has a maximum devitrification speed above 10 μm per minute and below 100 μm per minute (12 μm per minute). The maximum devitrification speed of the sample of silicate glass-1 and that of the sample of silicate glass-2 are 1200 μm per minute and 4000 μm per minute, respectively, and are thus greater 100 μm per minute. Then, the samples were heated and drawn by the above described manufacturing method, to obtain drawn glasses.

A visual observation of the surfaces of the through holes of the obtained drawn glasses showed that the samples of soda lime silicate glass and low alkali silicate glass had no devitrification nor surface irregularities. The sample of germanate glass showed slight devitrification, and also slight surface irregularities. Therefore, the samples of soda lime silicate glass, low alkali silicate glass, and germanate glass turned out to be suitable for manufacture of glass parts for connection of optical fibers according to the present invention. The samples of silicate glass-1 and silicate glass-2 showed a high degree of devitrification as well as many surface irregularities, and thus turned out to be

TABLE 1

| COMPOSITION (WEIGHT %) | SODA LIME SILICATE GLASS | LOW ALKALI SILICATE GLASS | GERMANATE GLASS | SILICATE GLASS-1 $Na_2O.2SiO_2$ | SILICATE GLASS-2 $Li_2O.2SiO_2$ |
|---|---|---|---|---|---|
| $SiO_2$ | 70~73 | 56~58 | | 66 | 80 |
| $GeO_2$ | | | 100 | | |
| $Al_2O_3$ | 1.0~1.8 | 5~7 | | | |
| $Fe_2O_3$ | APPROX. 0.1 | APPROX. 0.1 | | | |
| $ZrO_2$ | | 2~3 | | | |
| MgO | 1.0~4.5 | 2~3 | | | |
| CaO | 7~12 | 4~6 | | | |
| SrO | | 5~7 | | | |
| BaO | | 6~8 | | | |
| $Li_2O$ | | | | | 20 |
| $Na_2O$ | 13~15 | 3.5~5.0 | | 34 | |
| $K_2O$ | | 5~8 | | | |
| MAXIMUM DEVITRIFICATION SPEED (μm/min.) | 5 | 0.1 | 12 | 1200 | 4000 |
| DEVITRIFICATION | NIL | NIL | SLIGHT | MANY | MANY |
| SURFACE IRREGULARITIES | NIL | NIL | SLIGHT | MANY | MANY | unsuitable for manufacture of glass parts for connection of optical fibers according to the present invention.

FIGS. 3A to 3C and FIGS. 4A to 4C are sectional views and end views of ferrules manufactured by the manufacturing method according to the present invention, in which FIGS. 3A to 3C show a ferrule which has a through hole with a tapered open end, and FIGS. 4A to 4C show a ferrule which has a through hole with tapered opposite open ends.

In FIGS. 3A to 3C and FIGS. 4A to 4C, the through hole 21 of the ferrule 20 has a square cross section. The open ends 22 to 24 of the through hole 21 are tapered to facilitate the insertion of optical fibers into the through hole 21. The tapering is conducted by masking the peripheral surface of the glass ferrule 20 with a coating material, and treating the end face(s) of the ferrule 20 with a glass erosion solution (as disclosed e.g. by Japanese Patent Publication (Kokoku) 63-44701). The tapering may be conducted mechanically by drilling or by sand blasting.

Further, in order to hold glass fibers 25 within the through hole 21 of the ferrule 20, a hole may be formed in the peripheral surface of the ferrule so that a matching agent or adhesive agent may be poured into the through hole.

The through hole 21 of the ferrule 20 may have other cross sections such as equilateral triangle and rectangle other than the square cross section (FIGS. 5A to 8C).

Figure 5A:
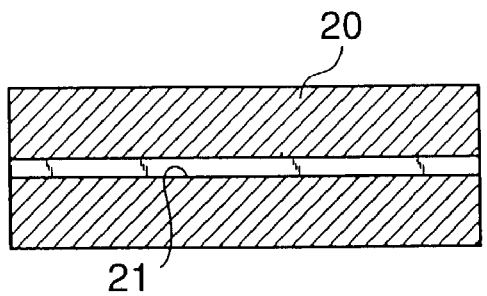
Figure 5B:
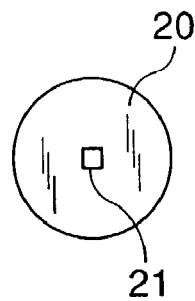
Figure 5C:
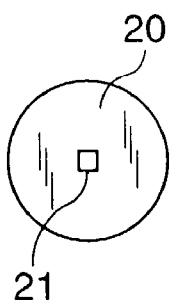
Figure 6A:
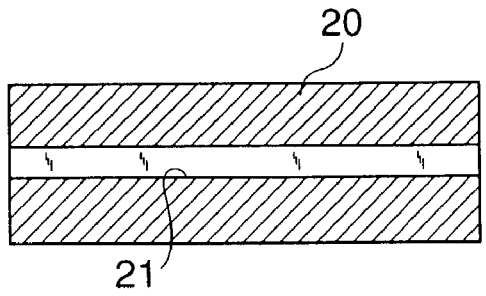
Figure 6B:
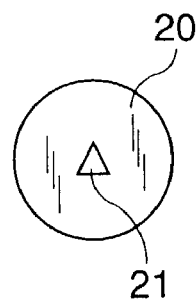
Figure 6C:
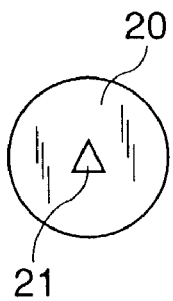
Figure 7A:
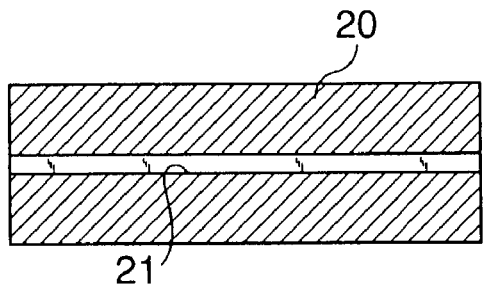
Figure 7B:
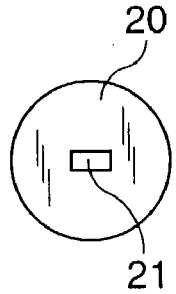
Figure 7C:
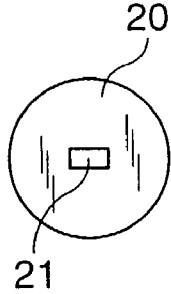
Figure 8A:
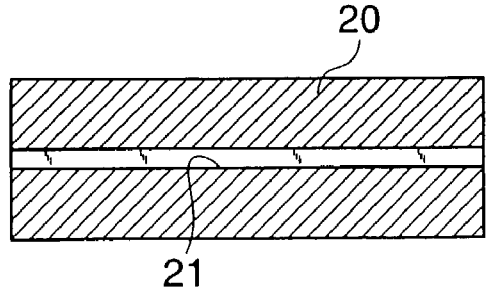
Figure 8B:
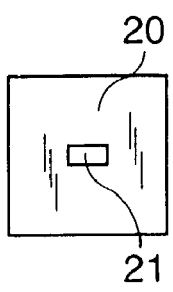
Figure 8C:
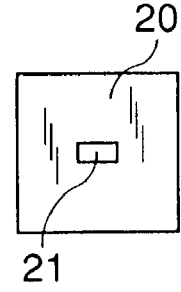

FIGS. 5A to 8C are views showing through holes 21 of the ferrule 20 which have various cross sections. The through holes in these figures do not have tapered open ends. FIGS. 5A to 5C show a case where the ferrule 20 has a circular cross section and the through hole 21 has a square cross section. FIGS. 6A to 6C show a case where the ferrule 20 has a circular cross section and the through hole 21 has a cross section of equilateral triangle. FIGS. 7A to 7C show a case where the ferrule 20 has a circular cross section and the through hole 21 has a rectangular cross section. FIGS. 8A to 8C show a case where the ferrule 20 has a square cross section and the through hole 21 has a rectangular cross section. In addition, the combination of the cross section of the ferrule 20 and the cross section of the through hole 21 may be changed in various ways.

Within the through hole 21 formed in the ferrule 20, a matching agent is filled between the opposed end faces of the optical fibers 25 and 25, so as to match the refractive index between the optical fibers 25 and 25 as well as bond the optical fibers together. In addition, the matching agent or an adhesive agent is filled in gaps between the wall of the through hole 21 and the optical fibers 25 and 25 to fix the optical fibers 25 and 25 in place inside the through hole 21. The same construction applies to ferrules 20 in examples described below.

In the above described cases, the ferrule 20 has a single optical fiber 25 inserted in the through hole 21. However, the ferrule according to the present invention includes a type which has a plurality of optical fibers 25 inserted in parallel in the through hole 21, for transmitting and receiving optical signals to and from other apparatuses.

Figure 9A:
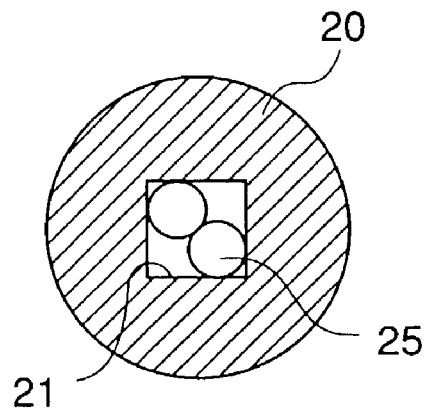
Figure 9B:
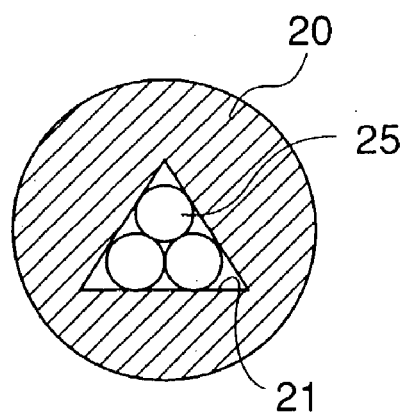
Figure 9C:
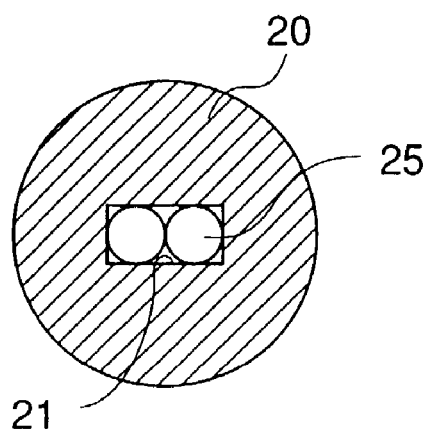

FIGS. 9A to 9C are transverse sectional views of the ferrules 20 of FIGS. 5A to 7C when a plurality of optical fibers are inserted in parallel in the respective through holes 21 formed in the ferrules 20. FIG. 9A shows a state where two optical fibers are held within the through hole 21 with a square cross section. FIG. 9B shows a state where three optical fibers are held within the through hole 21 with an equilateral triangular cross section. FIG. 9C shows a state where two optical fibers are held within the through hole 21 with a rectangular cross section.

As shown in FIGS. 9A to 9C, when the cross section of the through hole 21 formed in the ferrule 20 is square, triangular, or rectangular, it is possible to accurately align two groups of plural optical fibers 25 within a single through hole 21 and hold the optical fibers in the aligned state. Further, when optical fibers 25 and 25 and through hole 21 are matched, extraction of air and extraction of matching agent/adhesive agent can be performed through gaps between the optical fibers 25 and the wall of the through hole 21.

FIGS. 10A to 10K are transverse sectional views showing variations of the ferrule 20 with various cross sections of the through hole 21.

Figure 10A:
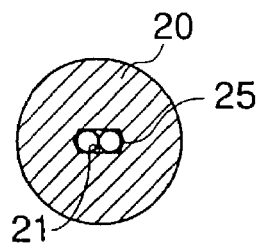
Figure 10B:
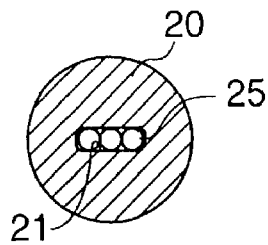

FIG. 10A shows a state where two optical fibers are held within a through hole 21 with a hexagonal cross section. FIG. 10B shows a state where three optical fibers are held in a line within a through hole 21 with an octagonal cross section.

Figure 10C:
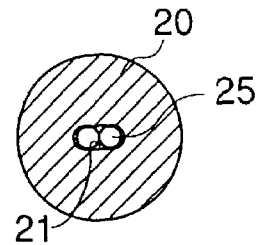
Figure 10D:
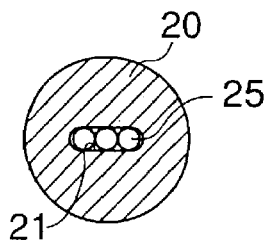

FIG. 10C shows a state where two optical fibers are held within a through hole 21 with an oblong cross section. FIG. 10D shows a state where three optical fibers are held in a line within a through hole 21 with an oblong cross section.

Figure 10E:
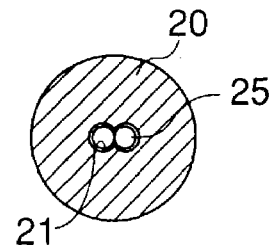
Figure 10F:
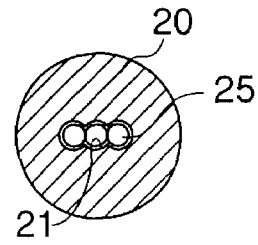
Figure 10G:
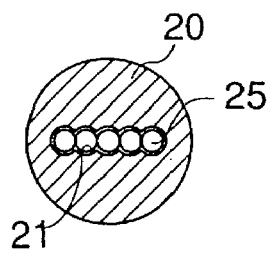

FIG. 10E shows a state where two optical fibers are held within a through hole 21 with a cross section of connected circles of which two circular holes are connected in a line. FIG. 10F shows a state where three optical fibers are held in a line within a through hole 21 with a cross section of connected circles of which three circular holes are connected in a line. FIG. 10G shows a state where five optical fibers are held in a line within a through hole 21 with a cross section of connected circles of which five circular holes are connected in a line.

Figure 10H:
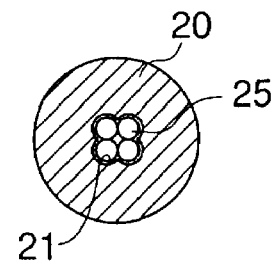

FIG. 10H shows a state where a bundle of four optical fibers are held within a through hole 21 with a cross section of connected circles of which four circular holes are connected to form a square.

Figure 10I:
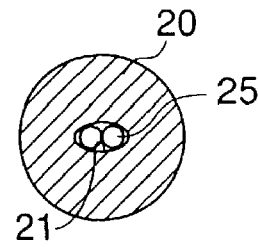

FIG. 10I shows a state in which two optical fibers are held within a through hole 21 with a cross section of ellipse.

Figure 10J:
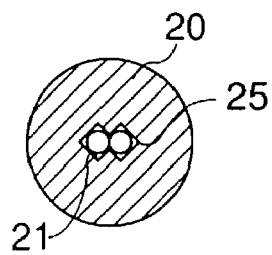
Figure 10K:
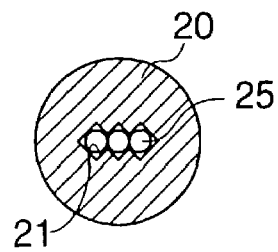

FIG. 10J shows a state where two optical fibers are held within a through hole 21 with a cross section of connected squares of which two squares are connected in a line. FIG. 10K shows a state where three optical fibers are held in a line within a through hole 21 with a cross section of connected squares of which three squares are connected in a line.

In the above variations of FIGS. 10A to 10K, the number of optical fibers to be held in the respective through holes 21 may be different from the illustrated numbers. Further, the cross section of the ferrule 20 is not limited to the circular shape as shown in the variations of FIGS. 10A to 10K, and may, for example, be square.

As shown in FIGS. 10A to 10K, when the cross section of the through hole 21 formed in the ferrule 20 is hexagonal, octagonal, oblong, connected circles, ellipse, or connected squares, it is possible to accurately align two groups of plural optical fibers 25 within a single through hole 21 and hold the optical fibers in the aligned state. Further, when optical fibers 25 and 25 and through hole 21 are matched, extraction of air and extraction of matching agent/adhesive agent can be performed through gaps between the optical fibers 25 and the wall of the through hole 21. In addition, it is possible to reduce the amount of matching agent/adhesive agent that is used since the volume of the gaps is less than that of a through hole 21 with a triangular or square cross section, thereby achieving cost reduction, as well as reduction of an amount of gas generated due to a chemical reaction that hardens the matching agent/adhesive agent. In particular, when the cross section of through hole 21 of ferrule 20 is hexagonal, octagonal, or connected squares, as shown in FIGS. 10A, 10B, 10J and 10K, the points or parts of contact between the optical fibers 25 and the wall of the through hole 21 increase and thus the optical fibers can be stably fixed in place. When the cross section of the through hole 21 of the ferrule 20 is an oblong, connected circles, or ellipse, as shown in FIGS. 10C to 10I, the area of contact between the optical fibers 25 and the wall of the through hole 21 further increases, and the optical fibers 25 can be also stably fixed in place.

As the glass material for the mother glass 41, a material is preferable, which has a maximum devitrification speed of 100 μm or less per minute, preferably 10 μm or less per minute, as previously stated. Further, a preferable material should have approximately the same coefficient of linear expansion as that of the optical fibers to be connected. In addition, it is possible to use crystallized glass as the glass material for the mother glass. However, in this case, a glass having a maximum devitrification speed of 100 μm or less per minute, preferably 10 μm or less per minute should be used so as to maintain required dimensional stability during the hot drawing process and the hot drawn glass is crystallized by heating after the hot drawing. It is preferable to use a glass material for the mother glass 41 which has a composition, for example, of 70 to 73 weight % of silica, 1 to 2 weight % of alumina, 7 to 12 weight % of CaO, 1 to 5 weight % of MgO, and 13 to 15 weight % of alkali.

Next, description will be given of a method of manufacturing mother glass to produce glass parts for connection of optical fibers according to the present invention with reference to the drawings showing embodiments thereof.

The method of manufacturing mother glass applies to the mother glass 41 which is used when the through hole 21 of the ferrule 20 has a polygonal cross section. The manufacturing method is shown in FIGS. 11A to 14C.

First, a plurality of glass elements 26 with a quadrangular cross section are prepared in a number equal to the number of sides of the polygonal cross section of the through hole 21. Then, the glass elements 26 are put together so as to form a through hole having a cross section of a polygon. Next, the glass elements 26 put together are bonded together by heat fusion, and then, the periphery of the bonded glass elements 26 is formed into a cylindrical or prismatic shape by machining or the like. Thus, the mother glass 41 for the ferrule 20 is completed.

In the examples of FIGS. 11A to 14C, the example of FIGS. 11A to 11C is a case where the mother glass 41 has a circular cross section and the through hole in the mother glass 41 has a cross section of equilateral triangle. The example of FIGS. 12A to 12C is a case where the mother glass 41 has a circular cross section and the through hole in the mother glass 41 has a square cross section. The example of FIGS. 13A to 13C is a case where the mother glass 41 has a circular cross section and the through hole in the mother glass 41 has a rectangular cross section. The example of FIGS. 14A to 14C is a case where the mother glass 41 has a square cross section and the through hole in the mother glass 41 has a rectangular cross section. In addition, the combination of the cross section of the mother glass 41 and the cross section of the through hole may be changed in various ways.

In the illustrated examples, the glass elements 26 having a quadrangular cross section(s) are used in a number equal to the number of sides of the polygonal cross section of the through hole 21 in the ferrule 20. However, other glass elements may be used, which are comprised of a first half having a groove or channel for receiving a through hole, and a second halt which is joined to the first half such that a flat side surface of the second half closes the groove or channel in the first half.

According to the present embodiment, a through hole can easily be formed in the mother glass 41.

Next, a glass part for connection of optical fibers according to another embodiment of the present invention will now be described with reference to FIGS. 15A to 15C, and FIG. 16.

Figure 15A:
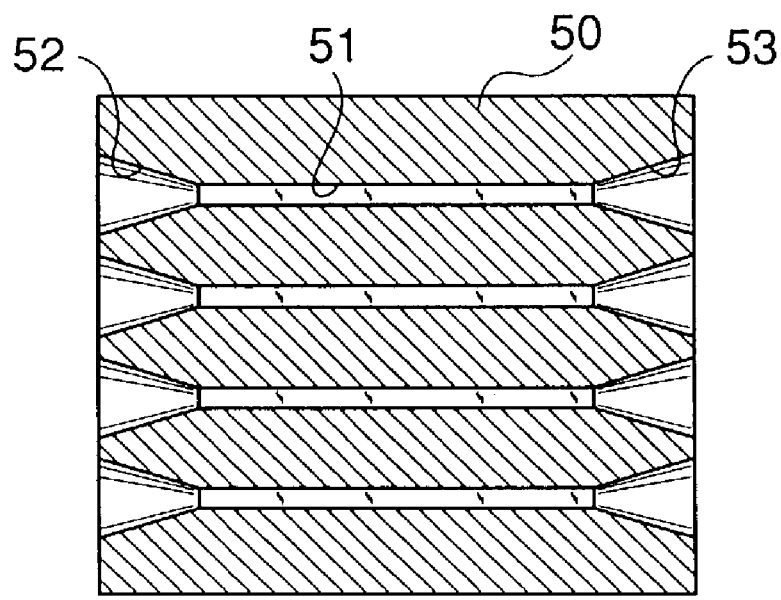
Figure 15B:
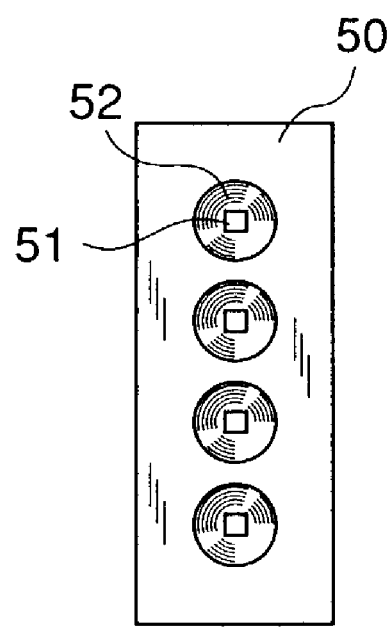
Figure 15C:
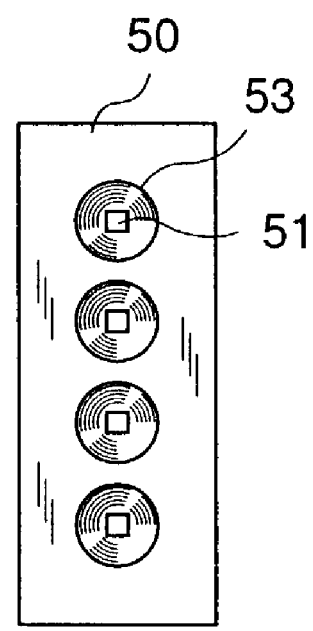

FIGS. 15A to 15C show a ferrule 50 as a glass part for connection of optical fibers according to the present embodiment. The ferrule 50 has a rectangular cross section and four through holes 51 having a square cross section are formed in the ferrule 50 along a longitudinal axis thereof in equal spaced relation. The through holes 51 are tapered at its opposite open ends 52 and 53, and have approximately the same cross sectional size as that of the optical fibers to be connected. The number and layout of the through holes 51 are not limited to those shown in the illustrated embodiment. Further, it is not necessary that the open ends of the through holes 51 be tapered. The inside diameter of the through holes 51 is, for example, 0.086 to 0.15 mm.

The ferrule constructed as above is produced by the above described manufacturing method, and the mother glass used to manufacture the ferrule may be produced by the above described method of manufacturing mother glass, or by machining or press molding.

Figure 16:
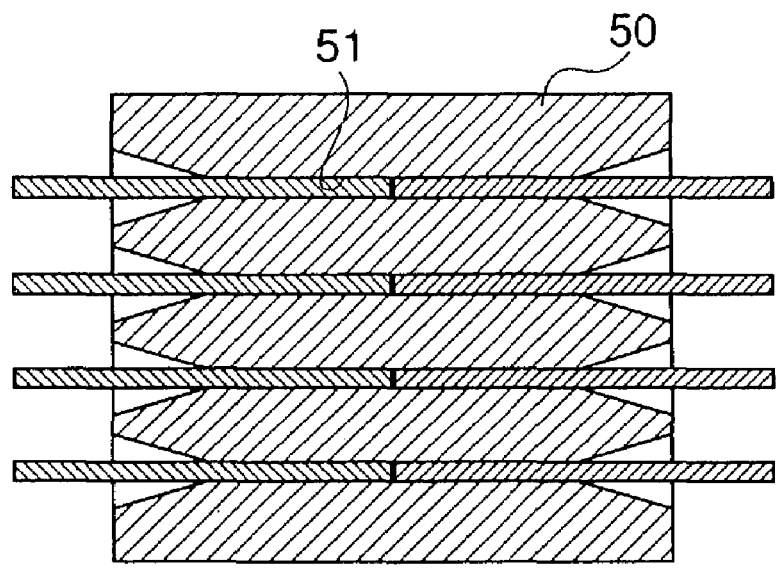
FIG. 16 is a view showing a state in which four optical fibers are connected by the ferrule 50 shown in FIGS. 15A to 15C.
Figure 17:
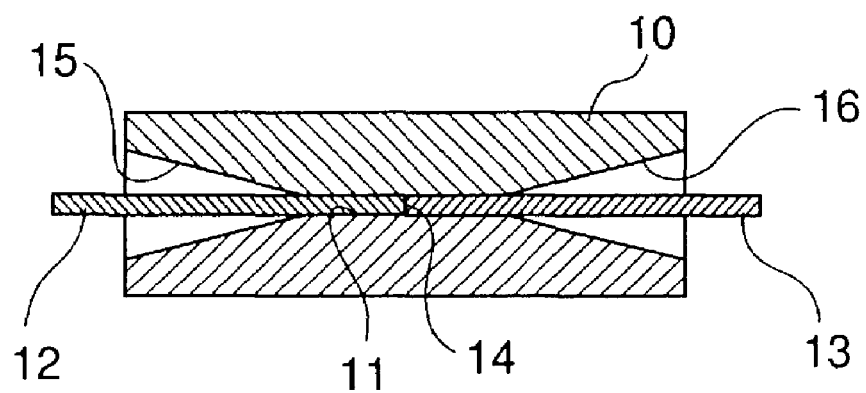
FIG. 17 is a cross-sectional view of a conventional integral type optical connector.

The ferrule 50 constructed as above is capable of making a connection between two groups of four optical fibers such that the two groups of four optical fibers are precisely aligned. FIG. 16 shows a state where the ferrule 50 connects the two groups of four optical fibers.

In the present embodiment described above, the glass part for connection of optical fibers is designed to connect optical fibers. However, the present invention may be applied to connect an optical fiber(s) and a light emitting/receiving device(s) or the like.

As described above, according to the method of manufacturing glass parts for connection of optical fibers of the present invention, the mother glass is made of a glass having a maximum devitrification speed of 100 μm or less per minute. As a result, the occurrence of devitrification can be prevented during the hot drawing process of the mother glass, which improves the dimensional characteristics of the drawn glass, and thus it is possible to form a through hole in the glass part for connection of optical fibers with high dimensional accuracy.

According to the method of manufacturing mother glass to produce glass parts of the present invention, a plurality of glass elements having a polygon cross section are put together and bonded together by heat fusion so as to form a through hole having a polygonal cross section. Thus, it is possible to easily form a through hole in the mother glass.

The glass parts for connecting optical fibers according to the present invention have a through hole with a cross section of a shape selected from the group consisting of polygon, oblong, ellipse, connected circles, and connected squares. This makes it possible to accurately align two groups of plural optical fibers within a single through hole and hold the optical fibers in the aligned state. When the optical fibers the through hole 21 are matched, extraction of air and extraction of matching agent/adhesive agent can be performed through gaps between the optical fibers and the wall of through hole. Further, it is possible to reduce the amount of matching agent/adhesive agent used since the volume of the gaps is reduced. Therefore, cost reduction, as well as reduction of an amount of gas generated due to a chemical reaction that hardens the matching agent/adhesive agent. In particular, when the cross section of the through hole of the ferrule is hexagonal, octagonal, or connected squares, the points or parts of contact between the optical fibers and the wall of through hole increase, and thus the optical fibers can be stably fixed in place. When the cross section of the through hole of the ferrule is an oblong, connected circles, or ellipse, the area of contact between the optical fibers 25 and the wall of through hole 21 further increases, and the optical fibers 25 can be stably fixed in place.

The glass parts for connection of optical fibers according to the present invention have a plurality of through holes formed therein, and thus it is possible to make a connection between two groups of plural optical fibers such that the two groups of plural optical fibers are precisely aligned.

What is claimed is:

1. A method of manufacturing a glass part for connection of optical fibers, said glass part having at least one through hole formed therein to hold optical fibers, comprising the steps of:

preparing a mother glass having a similar cross section to a desired cross section of the glass part; and drawing the prepared mother glass while heating the same;

wherein the mother glass is made of a glass having a maximum devitrification speed of 100 $\mu$m or less per minute.

2. A method as claimed in claim 1, wherein the mother glass is made of a glass having a maximum devitrification speed of 10 $\mu$m or less per minute.

3. A method as claimed in claim 1, wherein the mother glass is made of a glass selected from the group consisting of soda lime silicate glass, low alkali silicate glass, and germanate glass.

4. A method as claimed in claim 1, wherein the mother glass has a polygonal through hole.

5. A method as claimed in claim 1, additionally comprising tapering open ends of said through hole.

6. A method as claimed in claim 1, wherein the through hole has a shape that aligns and holds a plurality of optical fibers.

* * * * *